United States Patent
Tsai et al.

[15] 3,676,474
[45] July 11, 1972

[54] MULTINUCLEAR π-COMPLEXES HAVING AT LEAST TWO METAL-COBALT BONDS

[72] Inventors: James H. Tsai, Sarnia, Ontario; Glenn H. Anderson, Corunna, Ontario, both of Canada

[73] Assignee: The Dow Chemical Company, Midland, Mich.

[22] Filed: Nov. 24, 1969

[21] Appl. No.: 879,608

[52] U.S. Cl. .................260/429 R, 252/431 R, 252/431 N, 260/429.7, 260/435 R, 260/439 R, 260/439 CY, 260/666 R
[51] Int. Cl. ................C07f 7/00, C07f 7/24, C07f 15/06
[58] Field of Search .................260/429, 429.7, 439, 435

[56] References Cited

UNITED STATES PATENTS

| | | | |
|---|---|---|---|
| 3,030,396 | 4/1962 | Gorsich | 260/429.7 |
| 3,099,667 | 7/1963 | Gorsich | 260/429 |
| 3,141,031 | 7/1964 | Wilkinson | 260/439 |
| 3,345,390 | 10/1967 | Wilkinson | 260/429 |

OTHER PUBLICATIONS

Schrauzer et al. J. Am. Chem. Soc. 88 (1967) p. 4890–4
Patmore et al. (I) Inorg. Chem. 5 (1966) p. 2222–6
Patmore et al. (II) Inorg. Chem. 5 (1966) p. 1405–7
Bonati et al. J. Chem. Soc. (A), 1966 p. 1052–5

*Primary Examiner*—James E. Poer
*Assistant Examiner*—A. P. Demers
*Attorney*—Griswold and Burdick, R. G. Waterman, L. J. Dankert and M. S. Jenkins

[57] ABSTRACT

Multinuclear cobalt carbonyl π-Complexes having metal-cobalt bonds and which are useful as catalysts for the dimerization of norbornadiene are represented by the general formula: $Z_{4-m}MCo_m(CO)_{4m-2n}Y_n$ wherein M is a Group 4a metal, Z is a halo, nitrato, alkyl, aryl or similar ligand, Y is a π-bonded diolefin ligand, $m$ is 2, 3, or 4, and $n$ is 1, 2, 3, or 4, but not greater than $m$.

22 Claims, No Drawings

MULTINUCLEAR π-COMPLEXES HAVING AT LEAST TWO METAL-COBALT BONDS

BACKGROUND OF THE INVENTION

This invention relates to a new class of organo-cobalt compounds, and more particularly, to multinuclear, cobalt carbonyl π-complexes having metal-cobalt bonds.

Binuclear, diolefin cobalt carbonyl complexes of the types, $Co_2(CO)_6$(diolefin) and $Co_2(CO)_4$(diolefin), in which the carbonyl groups bridge the Co-Co bond have been prepared by the direct interaction of dicobalt octacarbonyl with various diolefins such as 1,3-butadiene and isoprene.

Multinuclear, cobalt carbonyl, π-complexes having at least two metal-cobalt bonds have not been previously known.

SUMMARY OF THE INVENTION

In accordance with the present invention, multi-nuclear, cobalt carbonyl π-complexes having at least two metal-cobalt bonds are provided. Such π-complexes are represented by the general formula:

$$Z_{4-m}MCo_m(CO)_{4m-2n}Y_n$$

wherein M is a metal of Group 4a of the Periodic Table of Elements, Z is a ligand selected from the group consisting of halo, nitrato, alkyl and aryl, Y is a π-bonded diolefin ligand, $m$ is 2, 3, or 4 and $n$ is 1, 2, 3, or 4, but not greater than $m$. For the purposes of this invention alkyl includes alkyl, cycloalkyl and substituted alkyl such as haloalkyl and aryl includes aryl and substituted aryl such as haloaryl.

These multinuclear π-complexes are useful as catalysts for the dimerization of norbornadiene and substituted norbornadienes. Said complexes are also suitably employed in the polymerization of other olefins such as allene. The multinuclear π-complexes wherein Z is halo are particularly effective in the stereospecific dimerization of norbornadiene. The π-complexes may also be employed as chemical intermediates in the preparation of other complexes.

DESCRIPTION OF THE PREFERRED EMBODIMENTS

The novel compounds of the present invention are characterized as multinuclear, cobalt carbonyl π-complexes having at least two metal-cobalt bonds. By a multinuclear complex is meant a compound having at least 3 metal atoms including the cobalt atoms per molecule. The carbonyl ligands of the novel π-complexes of this invention are bonded to the cobalt atoms and do not bridge the cobalt atoms. These complexes are classed as π-complexes since they contain diolefin ligands which are π-bonded to the cobalt atoms. These novel multinuclear, π-complexes are generally represented by the formula: $Z_{4-n}MCo_m(CO)_{4m-2n}Y_n$ wherein Z, M and Y are described hereinafter in more detail and $m$ is 2, 3, or 4 and $n$ is 1, 2, 3, or 4 but not greater than $m$.

More specifically M is a metal of Group 4a of the Periodic Table of Elements, Handbook of Chemistry and Physics, 48th ed., The Chemical Rubber Company. Illustratively, M includes tin, germanium, silicon, and lead, preferably tin and germanium.

Specifically Z is an inorganic or organic ligand. Suitable inorganic ligands are selected from the groups consisting of halo, such as fluoro, chloro, bromo and iodo; and nitrato. Preferred inorganic ligands are bromo and chloro. Suitable organic ligands include alkyl and substituted alkyl wherein the substituent is aryl, halo, alkoxy, amino and the like; cycloalkyl and substituted cycloalkyl; aryl and substituted aryl wherein the substituent is alkyl, halo, alkyoxy, amino and the like; and related organic groups. Preferred organic ligands include phenyl and alkyl wherein alkyl has one to four carbon atoms.

In defining Z, it is to be understood that Z can be more than one of the above described ligands in a single molecule of the multinuclear π-complex. For example, a complex represented by the structure:

is contemplated. Also contemplated are complexes represented by the general structure:

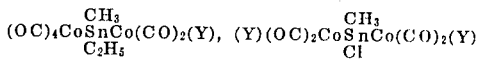

and

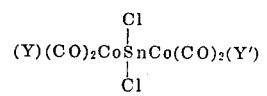

where Y and Y' may be, e.g. norbornadiene and butadiene, respectively.

Specifically Y is a π-bonded diolefin ligand having from three to 10 carbon atoms, preferably from four to eight carbon atoms. In the complex, Y is π-bonded to a cobalt atom. Illustratively, Y includes acyclic conjugated alkadienes having from four to eight carbon atoms, e.g., buta-1,3-diene, isoprene, panta-1,3-diene, 2,3-dimethylbuta-1,3-diene, hexa-1,3- and hexa-1,4-diene, octa-2,4-diene, 2-methylpenta-1,3-diene, and the like; alkoxy substituted acyclic conjugated alkadienes, e.g., 2-methoxybuta-1,3-diene, 2,3-dimethoxybuta-1,3-diene, 2-methoxy-3-ethoxypenta-1,3-diene, and the like; cyclic alkadienes, e.g., cyclopentadiene, cyclohexa-1,3-diene, cycloocta-1,3-diene, cyclohexa-1,4-diene, cyclohepta-1,3-diene, cyclohepta-1,4-diene, cycloocta-1,5-diene, and the like; aryl substituted acyclic conjugated alkadienes, e.g., 1,4-diphenylbuta-1,3-diene and the like; polycyclic alkadienes, e.g., norbornadiene and substituted norbornadienes, bicyclo-[2.2.0]hexa-2,5-diene, spiro[4.4]nona-1,3-diene, spiro-[4.2] hepta-1,3-diene, bicyclo[4.2.0]octa-2,4diene, bicyclo[3.3.0] octa-1,3-diene,bicyclo[3.2.1.,]octa-2,6-diene and the like. Preferably the diolefin ligand is norbornadiene, substituted norbornadienes, conjugated alkadienes and substituted alkadienes having from four to eight carbon atoms and the like.

Representative multinuclear π-complexes include, for example, dichlorobis(norbornadienedicarbonylcobalt)tin-(IV), dibromobis(norbornadienedicarbonylcobalt)tin(IV), dimethyl- and diphenylbis(norbornadienedicarbonylcobalt)-tin(IV), dichloro(norbornadienedicarbonylcobalt)(tetracarbonylcobalt)tin(IV), dibromo(norbornadienedicarbonylcobalt)(tetracarbonylcobalt)tin(IV), dimethyl- and diphenyl-(norbornadienedicarbonylcobalt)(tetracarbonylcobalt)tin-(IV), dichloro- and dibromobis(1,3-butadienedicarbonylcobalt)tin(IV), dichloro- and dibromo(1,3-butadienedicarbonylcobalt)(tetracarbonylcobalt)tin(IV), chloro- and bromo(norbornadienedicarbonylcobalt)bis(tetracarbonylcobalt)tin(IV), chloro- and bromobis(norbornadienecarbonylcobalt)(tetracarbonylcobalt)tin-(IV), chloro- and bromotris(norbornadienedicarbonylcobalt)tin(IV), phenylethylbis-(buta-1,3-dienedicarbonylcobalt)germanium(IV), diphenylbis(norbornadienedicarbonylcobalt)germanium(IV), chlorophenylbis(isoprenedicarbonylcobalt)lead(IV), methyltris-(cyclopentadienedicarbonylcobalt)silicon(IV), dinitrobis-(cyclohexa-1,3-dienedicarbonylcobalt)tin(IV), dibromo-(cyclohexa-1,3-dienedicarbonylcobalt)(tetracarbonylcobalt)-tin(IV), di-iodo(cyclohepta-1,4-dienedicarbonylcobalt)-(cycloocta-1,5-dienedicarbonylcobalt)silicon(IV), dibromobis(cyclohexa-1,3-dienedicarbonylcobalt)tin(IV), dichloro-(1,3-butadienedicarbonylcobalt)(norbornadienedicarbonylcobalt)germanium(IV), chloro- and bromo(norbornadienedicarbonylcobalt)(buta-1,3-dienedicarbonylcobalt)(tetracarbonylcobalt)tin(IV), ethylbromobis(cyclopentadienedicarbonylcobalt)lead(IV) and various homologues of these complexes.

The novel multinuclear π-complexes of the present invention are advantageously prepared by a two step procedure. In the first step a complex having the general structure $Z_{4-m}MCo_m(CO)_{4m}$ is made and in the second step the product of the first step is contacted with the desired diolefin to yield the multinuclear π-complex.

In the instance wherein Z is halogen and m is 2, the first step involves reacting a metal compound, $MX_2$ with X representing halogen greater than fluorine with an equimolar amount of dicobalt octacarbonyl in an ether or alcohol diluent to form an insertion product having the structure

For the compound in which Z is a halogen and m is 3, the reaction involves contacting 1 mole of $MX_2$ with 2 moles of dicobalt octacarbonyl in the same type of organic solvent to form the product having the structure

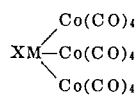

In the instance wherein m is 4, the reaction involves contacting 1 to 2 moles of $MF_2$ with a mole of dicobalt octacarbonyl in the same type of organic solvent to form the product having the formula $M[Co(CO)_4]_4$. The compounds wherein m is 2 or 3 can also be prepared by reacting a mole of anhydrous metal compound, $MX_4$, with 2 moles or 3 moles, respectively, of sodium tetracarbonylcobaltate-(1-).

In the instance wherein Z is an organic ligand such as alkyl, aryl, etc., the first step involves reacting an organo metallic compound, $R_2MX_2$ or $RMX_3$ with X representing halogen and R representing the organic ligand, with a slightly excess amount, say about 20 percent, of sodium tetracarbonylcobaltate(1-).

In the instance wherein Z is nitrato, the first step involves preparing the compound

by one of the aforementioned methods and subsequently reacting the compound with a methanol solution of silver nitrate.

Among the metal compounds, $MX_2$, which are suitable for the preparation of the insertion product wherein Z is halogen are the Group 4a metal dihalides such as tin(II) chloride, tin(II) bromide, tin(II) iodide, tin(II) fluoride chloride, tin(II) bromide chloride, germanium(II) chloride, germanium(II) bromide, germanium(II) iodide, lead(II) bromide, lead(II) iodide, lead(II) bromide chloride, silicon(II) chloride, silicon(II)bromide, and silicon(II)iodide, with the dihalides of tin and germanium being preferred.

Metal compounds, $MX_4$, which are suitable for reaction with sodium tetracarbonylcobaltate(1-) or the like are the Group 4a metal tetrahalides such as tin(IV) chloride, tin(IV) bromide, tin(IV) fluoride, tin(IV) iodide, tin(IV) bromide trichloride, tin(IV) dibromide dichloride, tin(IV) tribromide chloride, tin(IV) dibromide diiodide, tin(IV) dichloride diiodide, germanium(IV) fluoride, germanium(IV) bromide, germanium(IV) chloride, germanium(IV) iodide, germanium(IV) dichloride difluoride, germanium(IV) trichloride fluoride, silicon(IV) chloride, silicon(IV) bromide, silicon(IV) fluoride, silicon(IV) tetraiodide, silicon(IV) dibromide dichloride, silicon(IV) chloride trifluoride, silicon(IV) tribromide chloride, lead(IV) chloride, and the like.

Among the organometallic compounds, $R_2MX_2$ or $RMX_3$, which are suitable for preparing multinuclear π-complexes wherein at least one of Z is an organic radical are the Group 4a organometallic dihalides and organometallic trihalides. Examples include dimethyldichlorosilane, diphenyldichlorosilane, dibromodiethylsilane, diethyldichlorosilane, dipropylfluorochlorosilane, dibenzyldichlorosilane, phenylethyldichlorosilane, diethyltin dibromide, diethyltin dichloride, dipropyltin difluoride, di-n-butyltin diodide, diisopropyltin dibromide, diphenyltin dichloride, di-o-tolyltin dichloride, methyltin trichloride, divinyltin dichloride, phenyltin tribromide, ethylpropyltin dichloride, diethylgermanium dibromide, dimethylgermanium dichloride, diphenylgermanium diiodide, di-p-tolylgermanium difluoride, ethylgermanium triiodide, phenylgermanium tribromide, dicyclohexylgermanium dichloride, tolylgermanium trichloride, dimethyllead dichloride, diphenyllead dibromide and other known organometallic compounds which are generally described by $R_2MX_2$ or $RMX_3$.

The insertion reaction wherein Group 4a metal dihalide is reacted with dicobalt octacarbonyl is believed to involve attack of the cobalt-cobalt bond by the metal dihalide such that the cobalt-cobalt bond is broken and two or more metal-cobalt bonds are formed. The term "insertion reaction" is generally descriptive of this operation without mechanistic implications. Insertion reactions are described more particularly by D. J. Patmore and W. A. G. Graham, Inorganic Chemistry, Vol 5, No. 8, 1405 (1966) and in F. Bonati et al., J Chem. Soc. (A) 8, 1052–1055 (1968).

In the first step reactions employing sodium tetracarbonylcobaltate(1-), sodium amalgam is first interacted with dicobalt octacarbonyl to produce sodium tetracarbonyl cobaltate(1-), preferably in accordance with the method described by R. B. King, Organometallic Syntheses, 1, 152 (1965). The reaction of the sodium tetracarbonylcobaltate(1-) with metal tetrahalide $MX_4$ or with organometallic halide, $RMX_2$ or $RMX_3$, is advantageously carried out according to the method described by D. J. Patmore et al., Inorg. Chem., Vol 6, 981 (1967).

In the practice of this invention the second step reaction of first step product with diolefin to produce the multinuclear, π-complex is carried out by contacting the product of the first step with diolefin as described hereinbefore, preferably by dispersing the first step product into diolefin or its solution in an inert organic diluent such as n-pentane, dichloromethane, benzene and other hydrocarbon or halohydrocarbon solvents. It is also generally preferred to employ an excess of diolefin, e.g., from about 10 to about 1,000 moles of diolefin per mole of first step product, preferably from 25 to 500 moles. It is understood, however, that the second step reaction can be carried out by adding the reactants in any order with or without the presence of inert diluent or excess diolefin. During the second step reaction it is advantageous to stir or otherwise mix the reactants under an inert atmosphere such as nitrogen, helium and the like. Temperatures employed during this reaction suitably range from about 0° to 100° C, preferably from about 25° to about 75° C. The pressures employed can vary from about 1 to about 100 atmospheres, preferably from 1 to 2 atmospheres.

The period necessary to replace carbonyl with diolefin depends upon the amount of replacement desired. For example, if a mono-diolefin π-complex, e.g.,

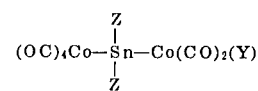

is desired, the period required is from about 178 to about 6 hours, preferably 2 to 5 hours. However, if a bis-diolefin π-complex, e.g.,

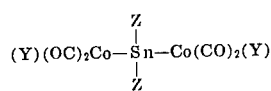

is desired, from about 6 to about 46 hours is required, preferably from 15 to 30 hours.

Both the first and second step reactions can be executed in a batch, semi-continuous, or continuous fashion. The reaction vessel can be a glass vessel, steel autoclave, elongated metallic tube, or other equipment and material employed in the art provided that such equipment is able to withstand the rigors of the reaction and that the reactants and products are not sensitive to this material of construction.

The novel multinuclear, π-complexes of the present invention can be recovered easily by extracting the reaction product, usually an oily residue, with inert hydrocarbon such as n-pentane and subsequently recrystallizing the complex from the inert hydrocarbon extract. Other conventional methods for recovering crystalline organo-metallic compounds also may be employed. For the stable π-complexes liquid-solid chromatographic column packed with solid material, e.g., alumina, may also be used for purification.

The multinuclear π-complexes wherein Z is halogen are particularly useful catalysts in the stereospecific dimerization of norbornadiene to form endo-cis-endo-heptacyclo[5.3.1.1$^{2,6}$.1$^{4,12}$.1$^{9,11}$.0$^{3,5}$.0$^{8,10}$]tetradecane having the structure

and hereinafter referred to as Binor-S. In carrying out such stereospecific dimerization process, norbornadiene or substituted norbornadiene is contacted with the multinuclear π-complex, preferably under an inert atmosphere such as nitrogen. Dimerization is suitably carried out at temperatures ranging from about 0° to 100°C, preferably from 40° to 80°C, and at pressures ranging from atmospheric to 100 atmospheres. The ratio of catalyst to norbornadiene or substituted norbornadiene employed ranges from about 0.001 mole of catalyst to about 0.05 per mole of norbornadiene, preferably from about 0.002 to 0.01, respectively. The dimerization period varies from about one minute to about 48 hours depending on the amount and species of catalyst, temperature and the like. Under the above specified conditions, more than 90 weight percent of norbornadiene dimer formed is Binor-S. Binor-S is particularly useful as a fuel additive and as a chemical intermediate for the preparation of other useful compounds.

The multinuclear, π-complexes wherein Z is alkyl, aryl or another suitable organic ligand are found to dimerize norbornadiene to known dimers other than Binor-S. Such dimers are also useful as fuel additives and chemical intermediates. All of the multinuclear, π-complexes of the invention are useful in the polymerization of other olefins and diolefins, for example, allene and cyclopentadiene.

The following examples are given to illustrate the invention and should not be construed as limiting its scope. All parts and percentages are by weight unless otherwise indicated.

EXAMPLE 1

A 1.18 g-portion (2.2 mmoles) of dichlorobis-(tetracarbonylcobalt)tin(IV) (Cl$_2$Sn[Co(CO)$_4$]$_2$) prepared by reacting tin(II) chloride with octacarbonyldicobalt is stirred with 10 g (110 mmoles) of norbornadiene at 60°–65°C under nitrogen atmosphere in a flask equipped with a condenser. After four hours under the above conditions an infrared spectrum of the reaction mixture indicates that Cl$_2$Sn[Co(CO)$_4$]$_2$ has been quantitatively converted to π-complex. By evacuation of the reaction mixture, more than 5 g of free olefin is recovered, leaving a blackish residue which is extracted with two 10-ml portions of n-pentane. The n-pentane extracts are combined and cooled in a dry ice bath for one hour. The mother liquor is then decanted and the blackish brown crystals in the flask are washed twice with cold n-pentane to yield 0.13 g of pure π-complex.

The n-pentane extraction residue is further extracted with two 4-ml portions of methylene chloride. To the combined extracts 20 ml of n-pentane is added and any floating solid formed is removed by centrifuging. Upon cooling of the solution in a dry ice bath for several hours, 0.62 g of the π-complex is obtained. Further work-up on the mother liquor by evaporation and cooling gives additional 0.24 g of the product. The total yield of π-complex is about 1 g (79 percent).

The π-complex exhibits the following characteristics:

| Analysis: | %C | %H |
|---|---|---|
| Calculated for Cl$_2$SnCo$_2$C$_{13}$H$_8$O$_6$: | 27.5 | 1.41 |
| Found: | 28.18 | 1.36 |

Solubility: Very soluble in methylene chloride, fairly soluble in norbornadiene, cyclohexane, n-pentane.

M.P.: Melts at 95° with decomposition.
IR: Carbonyl stretching bonds at 2100(s), 2047(s), 2037(s), 2022(s), 2011(s) and 1955(sh) cm$^{-1}$.
NMR: ( in trichlorodeuteromethane solution, using tetramethylsilane as internal standard) τ value (ppm) 5.81 (triplet), 6.40 (multiplet), 8.37 (triplet) Area Ratio: 2,1,1 respectively.

The above characteristics confirm the multi-nuclear π-complex, dichloro(norbornadienedicarbonylcobalt)-(tetracarbonylcobalt)tin(IV), Cl$_2$SnCo$_2$(CO)$_6$(norbornadiene).

A 4.53-g portion (49 mmoles) of norbornadiene and 0.30 g (0.49 mmoles) of the above π-complex are changed to a flask equipped with a condenser at room temperature. After replacing air in the system with nitrogen, the contents of the flask are heated to 90°C with stirring. Unreacted norbornadiene is removed by evacuating the flask leaving a black solid which is shown by gas chromatography to contain 90 percent Binor-S and 10 percent other known dimers of norbornadiene. The Binor-S is isolated by dissolving the black solid in dichloromethane, filtering the resultant solution through an alumina column, adding an equivalent amount of acetone, cooling and then filtering white crystals of Binor-S.

EXAMPLE 2

Under conditions similar to those used in Example 1, a 2.14-g. portion (3.45 mmoles) of dibromobis(tetracarbonylcobalt)tin(IV) is reacted with 20 g (220 mmoles) of norbornadiene. Following the recovery procedure of Example 1, blackish brown crystals of a π-complex are obtained at a yield of 1.51 g (63 percent yield). The resulting π-complex exhibits the following characteristics:

| Analysis: | %C | %H |
|---|---|---|
| Calculated for Br$_2$SnCo$_2$C$_{13}$H$_8$O$_6$: | 23.78 | 1.22 |
| Found: | 24.21 | 1.11 |

Solubility: Similar to that of Cl$_2$SnCo$_2$(CO)$_6$(norbornadiene)
IR: Carbonyl stretching bands at 2099(s), 2045(s), 2036(s), 2021(s), 2010(s), and 1995(sh) cm$^{-1}$.
NMR: τ value (ppm) 5.58 (triplet), 6.42 (multiplet), 8.37 (triplet) Area Ratio: 2,1,1 respectively.

The above characteristics confirm the multinuclear π-complex, dibromo(norbornadienedicarbonylcobalt)-(tetracarbonylcobalt)tin(IV), a Br$_2$SnCo$_2$(CO)$_6$(norborna-diene).

The above catalyst dimerizes norbornadiene to Binor-S when the dimerization procedure described in Example 1 is employed.

EXAMPLE 3

A 2.16-g portion (4.1 mmoles) of Cl$_2$Sn[Co(CO)$_4$]$_2$ and 10 g (110 mmoles) of norbornadiene are stirred at 60° C under nitrogen in a reaction flask equipped with a condenser. After 24 hours an additional 10 g of norbornadiene is added and the reaction is continued for another 24 hrs. A trace of free olefin is removed by evacuation, leaving a blackish solid which is washed with six 15-ml portions of cyclohexane on a suction funnel. The blackish sludge-like residue is then extracted with 15-ml portions of norbornadiene until the infrared spectrum of the extract shows no carbonyl stretching bands. The extracts are combined and the volume is reduced to about 30 ml. On cooling of the solution at 0°C overnight, blackish red crystals of π-complex are formed. The mother liquor is decanted and the crystals (0.5 g) are washed several times with cyclohexane. Further concentration and cooling of the mother liquor yields an additional 0.11 g of the product, resulting in a total yield of π-complex of 0.61 g (25 percent yield). The π-complex exhibits the following characteristics:

| Analysis: | %C | %H |
|---|---|---|
| Calculated for $Cl_2SnCo_2C_{18}H_{16}O_4$: | 35.8 | 2.66 |
| Found: | 35.95– | 2.47– |
|  | 36.26 | 2.61 |

Solubility: Very soluble in acetone (with decomposition) and methylene chloride, less soluble in norbornadiene, and much less soluble in non-polar solvents.

M.P.: Turns to purple-gray at 130°–140°C without melting.

IR: Carbonyl stretching bands at 2034(s), 2005(m), 1984(s) and 1970(sh) cm$^{-1}$.

NMR: τ value (ppm) 5.82 (triplet), 6.45 (multiplet), 8.64 (triplet) Area Ratio: 2,1,1 respectively.

X-ray: The molecular structure of the compound is determined by the Patterson and Fourier methods. Refinement is made by full-matrix least-squares assuming an isotropic temperature for the Sn, Cl, Co, C and O atoms gave an R-factor of 4.9 percent for 2977 reflections measured above background level on a Picker automatic diffractometer (MoKα radiation). Accordingly, the molecular structure is as follows:

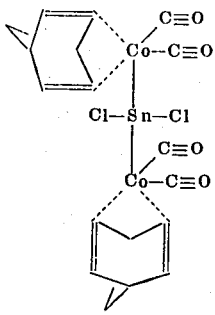

Accordingly, the multinuclear π-complex, dichlorobis(norbornadienedicarbonylcobalt)tin(IV); $Cl_2SnCo_2(CO)_4(C_7H_8)_2$ is confirmed.

The above π-complex show similar catalytic activity to those described in Examples 1 and 2.

EXAMPLE 4

Reaction of $Br_2Sn[Co(CO)_4]_2$ and norbornadiene under conditions similar to those described in Example 3 yields a π-complex which shows infrared and nmr spectra very similar to those of $Cl_2Sn[Co(CO)_2(NBD)]_2$. The multinuclear π-complex, dibromobis(norbornadienedicarbonylcobalt)tin(IV) is thus confirmed. This π-complex exhibits a catalytic activity similar to those described in Examples 1–3.

EXAMPLE 5

A 2.07-g portion (3.26 mmoles) of diphenylbis-(tetracarbonylcobalt)tin(IV), (phenyl)$_2$Sn[Co(CO)$_4$]$_2$, prepared by reacting diphenyldichlorotin(IV) with sodium tetracarbonylcobaltate(1-) in tetrahydrofuran is stirred with 10 g (110 mmoles) of norbornadiene at 60°C under nitrogen in a flask equipped with a condenser. After 24 hours, an additional 10 g of norbornadiene is added and the reaction is continued for another 24 hrs. The blackish tar-like reaction mixture is extracted with five 15-ml portions of n-pentane. The extracts are combined and filtered through an alumina column (1½ in. in diameter, 1 in. in length). The volume of filtrate is reduced to 10 ml by evaporation with a flow of nitrogen and any solid formed is removed by centrifuging. The supernatant liquid is then chromatographed on an alumina column (three-fourths in. in diameter, 10 in. in length) using n-pentane as eluent. Only one yellowish orange band is observed moving down the column. This fraction is collected and gradually evaporated to dryness with a flow of nitrogen. After the residue has been extracted several times with cold n-pentane, reddish brown solid is obtained at the bottom of the flask. Infrared analysis indicates that the solid is pure π-complex. The yield is 0.22 g. (10 percent yield).

Recrystallization of the π-complex is effected by dissolving the crude product in a minimum volume of norbornadiene followed by addition of an equal volume of n-pentane. Reddish brown, prismatic crystals are obtained on cooling of the solution at 0° for several hours. The π-complex exhibited the following characteristics:

| Analysis | %C | %H |
|---|---|---|
| Calculated for $SnCo_2C_{30}H_{26}O_4$: | 52.44 | 3.81 |
| Found: | 52.93 | 3.94 |

Solubility: Very soluble in methylene chloride, fairly soluble in norbornadiene, and less soluble in nonpolar solvents.

Melting point:
 Large crystals: Blacken at 170–172° with effervescence and becomes charcoal black at 178–180°.
 Crushed powder: Blackens at 168–170° (no gas evolution) and becomes gray ash at 175–180°.

IR: Carbonyl stretching bands at 2008(m), 1989(s), 1957(s), 1947(sh) cm$^{-1}$.

NMR: (τ value ppm) 2.35, 2.82 (due to the phenyl groups) 6.15, 6.67, 8.86 (due to (NBD).

The above characteristics confirm the multinuclear, π-complex, diphenylbis(norbornadienedicarbonylcobalt)tin(IV).

When the above π-complex is employed in the dimerization procedure described in Example 1, known dimers of norbornadiene other than Binor-S are formed.

EXAMPLE 6

A 1.09-g portion (1.75 mmoles) of $Br_2Sn[Co(CO)_4]_2$ and 18.5 g (340 mmoles) of 1,3-butadiene in 6 ml of dichloromethane are sealed under vacuum in a Carius tube equipped with a poly(tetrafluoroethylene) stopcock. The tube is heated to about 60° to 65°C for one day followed by cooling to −196°C and evacuation to remove CO gas formed. The same heating and evacuation process is repeated each day for three consecutive days. After the end of the reaction, the volatile liquid is removed by evacuation. The resulting black residue is dissolved in a minimum volume of dichloromethane and the solution is centrifuged and the supernatant solution is decanted. To the supernatant solution about three parts of n-pentane is added with stirring and the resulting solution is gradually cooled to dry ice temperature. After three hours the mother liquor is decanted and the resulting reddish black crystals are washed twice with cold n-pentane and dryed with a flow of nitrogen. The yield is 0.32 g. The decanted mother liquor is slowly evaporated to dryness with a flow of nitrogen. The residue is extracted twice with n-pentane. The extraction residue is dissolved in a minimum volume of dichloromethane, following by addition of n-pentane and cooling in a dry ice bath to produce more reddish black crystals. A total yield of 0.44 g (40 percent) is observed.

The reddish black crystals are purified by recrystallization from a dichloromethane/n-pentane system and are identified by elemental analysis and infrared and NMR data to be the π-complex, dibromo (1,3-butadienedi-carbonylcobalt)(tetracarbonylcobalt)tin(IV), $Br_2Sn[Co(CO)_4][Co(CO)_2(C_4H_6)]$.

The above π-complex is an active catalyst in the dimerization of norbornadiene to Binor-S and in the polymerization of allene.

EXAMPLE 7

A 0.23-g portion (0.43 mmoles) of $Cl_2Sn[Co(CO)_4]_2$ and 8.1 g (150 mmoles) of 1,3-butadiene in 5 ml of dichloromethane are heated under vacuum at 75°C in a sealed Carius tube for 20 hours. The tube is vented and volatile components removed under reduced pressure. The residue is extracted with dichloromethane several times and the combined extracts are allowed to evaporate slowly until almost dry. Washing of the solid with cyclohexane affords 0.03 g (13.2 percent) of reddish brown needles which are shown by elemental and spectral analyses to be the π-complex, dichlorobis(1,3-butadienedicarbonylcobalt)tin(IV), $Cl_2Sn[Co(CO)_2(C_4H_6)]_2$.

The above π-complex is an active catalyst in the dimerization of norbornadiene to Binor-S and in the polymerization of allene.

EXAMPLE 8

A 1.03-g portion (1.9 mmoles) of $Cl_2Sn[Co(CO)_4]$ and 14 g (152 mmoles) of norbornadiene in 15 ml of methylene chloride are stirred overnight at 50°C under nitrogen atmosphere. Following the work-up procedure of Example 1, 0.8 g (72 percent yield) of dichloro(norbornadienedicarbonylcobalt)(tetracarbonylcobalt)tin(IV) is isolated.

EXAMPLE 9

A 0.066-g portion (0.16 mmoles) of diphenylbis-(tetracarbonylcobalt)germanium(IV) prepared by reacting diphenylgermanium(IV) dichloride with large excess of sodium tetracarbonylcobaltate(1) is stirred with 1.3 g (14.1 mmoles) of norbornadiene at 75°-80°C for 12 hours under nitrogen atmosphere. Spectroscopic examination including a careful examination of the carbonyl stretching frequencies of the reaction mixture reveals that the starting germanium complex is converted entirely to diphenylbis(norbornadienedicarbonylcobalt)germanium(IV). This multinuclear, π-complex dimerizes norbornadiene to form several known dimers of norbornadiene.

EXAMPLE 10

A 0.59-g portion (0.93 mmoles) of dibromobis-(tetracarbonylcobalt)tin(IV) and 3.96 g (49.5 mmoles) of cyclohexa-1,3-diene are stirred at 70°C for about 2½ hours under nitrogen. The volatile organic components of the resulting reaction mixture are removed under reduced pressure, and the remaining residue is washed with 5 ml of n-pentane and is then extracted with two 2-ml portions of dichloromethane. To the combined extracts is added 8 ml of n-pentane with stirring. Any floating material in resulting supernatant liquid is removed by centrifugation and the liquid is cooled to −78°C. After 3 hours, 0.33 g (52 percent yield) of flaky, brown crystalline product is recovered.

The brown crystalline product is found to be a π-complex having the following characteristics:

| Analysis: | %C | %H |
|---|---|---|
| Calculated for $Br_2SnCo_2C_{12}H_8O_6$: | 22.36 | 1.25 |
| Found: | 23.25 | 1.85 |

Solubility: Slightly soluble in non-polar solvents and very soluble in polar solvents.
M.P.: Decomposed without melting at 108°-112°C to give a greenish gray solid.
IR: Carbonyl stretching frequencies (cm⁻¹) at 2096(s), 2057(s), 2042(s), 2025(s), 2013(m) and 1996(m).

The above characteristics confirm the multi-nuclear π-complex dibromo(cyclohexa-1,3-dienedicarbonylcobalt)(tetracarbonylcobalt)tin(IV), $Br_2SnCo_2(CO)_6(1,3-C_6H_8)$. This π-complex dimerizes norbornadiene to Binor-S when employed in the dimerization of Example 1.

EXAMPLE 11

A 1.23-g portion (1.97 mmoles) of dibromobis-(tetracarbonylcobalt)tin(IV) and 4 g (50 mmoles) of cyclohexa-1,3-diene are stirred at 85°-90°C for about 2 hours under nitrogen. After the volatile organic components are removed under reduced pressure, an additional 4 g (50 mmoles) of cyclohexa-1,3-diene is added to the residue and the resulting solution is heated 2 hours at 85°-90°C. The above volatization of organic components, addition of cyclohexa-1,3-diene and heating of the solution is repeated. After removing volatile components, the resulting black residue is washed with 15 ml of n-pentane and then extracted with two 2-ml portions of methylene chloride. Recrystallization from the combined extracts yielded 0.11 g (8.1 percent yield) of pure π-complex having the following characteristics:

| Analysis: | %C | %H |
|---|---|---|
| Calculated for $Br_2SnCo_2C_{16}H_{16}O_4$: | 28.74 | 2.41 |
| Found: | 28.91 | 2.53 |

Solubility: Slightly soluble in n-pentane, very soluble in methylene chloride and other polar solvents.
M.P.: 132–133 with decomposition.
IR: Carbonyl stretching frequencies (cm⁻¹) 2051(s), 2025(m to s), 2005(m,b), and 1995(Sb).

The above characteristics confirm the multinuclear, π-complex, dibromobis(cyclohexa-1,3-dienedicarbonylcobalt)tin(IV), $Br_2Sn[Co(CO)_2(1,3-C_6H_8)]_2$.

EXAMPLE 12

A 1-g portion (1.5 mmole) of chlorotris(tetracarbonylcobalt)tin(IV) prepared by reacting $SnCl_2$ with $Co_2(CO)_8$ in molar ratio of 1:2 is stirred with 9 g (98 mmoles) of norbornadiene at 65°-70°C for 7 hours under nitrogen. The resulting π-complex is isolated from the reaction mixture using the procedure set forth in Example 1. Spectroscopic examination and the elemental analysis of the π-complex confirms the multinuclear, π-complex of chloro(norbornadienedicarbonylcobalt)bis(tetracarbonylcobalt)tin(IV), $ClSnCo_3(CO)_{10}(C_7H_8)$. This π-complex is an effective catalyst for the dimerization of norbornadiene.

EXAMPLE 13

A 1.2-g portion (1.5 mmole) of tetrakis(tetracarbonylcobalt)tin(IV) prepared by reacting $SnF_2$ with $Co_2(CO)_8$ in molar ratio of 1:1 is stirred with 9 g (98 mmoles) of norbornadiene at 65°-70°C for 7 hours under nitrogen. The resulting π-complex is isolated from the reaction mixture using the procedure described in Example 1. Spectroscopic examination and elemental analysis of the π-complex confirms the multinuclear, π-complex of (norbornadienedicarbonylcobalt)tris(tetracarbonylcobalt)-tin(IV) $SnCo_3(CO)_{14}(C_7H_8)$. This π-complex is an effective catalyst for the dimerization of norbornadiene.

Similar multinuclear, π-complexes containing other Group 4a metals, other ligands and other π-ligands are prepared by techniques similar to those described above. All are active catalysts in the dimerization of norbornadiene.

What is claimed is:

1. A multinuclear π-complex having at least two metal-cobalt bonds represented by the general formula:

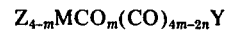

wherein M is a metal of Group 4a of the Periodic Table of Elements; Z is a ligand selected from the group consisting of halo, nitrato, alkyl and substituted alkyl wherein the substituent is aryl, halo, alkyoxy or amino, cycloalkyl, aryl and substituted aryl wherein the substituent is alkyl, halo, alkoxy or amino; Y is a π-bonded diolefin ligand having from four to eight carbon atoms selected from the group consisting of acyclic conjugated alkadienes, alkoxysubstituted acyclic conjugated alkadienes, cyclic alkadienes, aryl substituted acyclic conjugated alkadienes, polycyclic alkadienes; $m$ is 2, 3, 4 and $n$ is 1, 2, 3, or 4, but not greater than $m$.

2. A multinuclear π-complex according to claim 1 having at least two metal-cobalt bonds represented by the general formula:

$$Z_{4-m}MCo_m(CO)_{4m-2n}Y_n$$

wherein M is a metal of Group 4a of the Periodic Table of Elements; Z is a ligand selected from the group consisting of halo, nitrato, methyl, ethyl, propyl, butyl, cyclohexyl, phenyl, benzyl, and tolyl, Y is a π-bonded diolefin ligand selected from the group consisting of buta-1,3,-diene, isoprene, penta-1,3-diene, 2,3-dimethylbuta-1,3-diene, hexa1,3- and hexa-1,4-diene, octa-2,4-diene, 2-methylpenta-1,3-diene, 2 methoxybuta-1,3-diene, 2,3-dimethoxybuta-1,3-diene, 2-methoxy-3-ethoxypenta-1,3-diene, cyclopentadiene, cyclohexa-1,3-diene, cycloocta-1,3-diene, cyclohexa-1,4-diene, cyclohepta-1,3-diene, cyclohepta-1,4-diene, cycloocta-1,5-diene, 1,4-diphenylbuta-1,3-diene, norbornadiene, bicyclo[2.20]hexa-2,5-diene, spiro[4.4]nona-1,3-diene, spiro[4.2]hepta-1,3-diene, bicyclo[4.2.0]octa-2,4-diene, bicyclo[3.3.0]octa-1,3-diene, and bicyclo[3.2.1]octa-2,6-diene, $m$ is 2, 3, or 4 and $n$ is 1, 2, 3, or 4, but not greater than $m$.

3. The π-complex according to claim 1 wherein Z is chloro.
4. The π-complex according to claim 1 wherein Z is bromo.
5. The π-complex according to claim 1 wherein Z is phenyl.
6. The π-complex according to claim 1 wherein M is tin.
7. The π-complex according to claim 1 wherein M is germanium.
8. The π-complex according to claim 1 wherein Y is norbornadiene.
9. The π-complex according to claim 1 wherein Y is 1,3-butadiene.

10. The complex according to claim 1 wherein Y is cyclohexa-1,3-diene.
11. The complex according to claim 1 wherein the complex is dichlorobis(norbornadienedicarbonylcobalt)-tin(IV).
12. The complex according to claim 1 wherein the complex is dibromobis(norbornadienedicarbonylcobalt)-tin(IV).
13. The complex according to claim 1 wherein the complex is diphenylbis(norbornadienedicarbonylcobalt)-tin(IV).
14. The complex according to claim 1 wherein the complex is dibromo(norbornadienedicarbonylcobalt)-(tetracarbonylcobalt)tin(IV).
15. The complex according to claim 1 wherein the complex is dichloro(norbornadienedicarbonylcobalt)-(tetracarbonylcobalt)tin(IV).
16. The complex according to claim 1 wherein the complex is dibromo(1,3-butadienedicarbonylcobalt)-(tetracarbonylcobalt)tin(IV).
17. The complex according to claim 1 wherein the complex is dichlorobis(1,3-butadienedicarbonylcobalt)-tin(IV).
18. The complex according to claim 1 wherein the complex is dibromo(cyclohexa-1,3-dienedicarbonylcobalt)-(tetracarbonylcobalt)tin(IV).
19. The complex according to claim 1 wherein the complex is diphenylbis(norbornadienedicarbonylcobalt)-germanium(IV).
20. The complex according to claim 1 wherein the complex is dibromobis(cyclohexa-1,3-dienedicarbonylcobalt)tin(IV).
21. The complex according to claim 1 wherein the complex is chloro(norbornadienedicarbonylcobalt)bis-(tetracarbonylcobalt)tin(IV).
22. The complex according to claim 1 wherein the complex is (norbornadienedicarbonylcobalt)tris(tetracarbonylcobalt)tin(IV).

* * * * *